(12) United States Patent
Yourist et al.

(10) Patent No.: US 8,066,921 B2
(45) Date of Patent: Nov. 29, 2011

(54) SIMULTANEOUSLY BLOW MOLDED CONTAINER AND CLOSURE

(75) Inventors: Sheldon Yourist, York, PA (US); David W. Cargile, Lancaster, PA (US); Edward V. Perone, York, PA (US)

(73) Assignee: Graham Packaging Company, L.P., York, PA (US)

( * ) Notice: Subject to any disclaimer, the term of this patent is extended or adjusted under 35 U.S.C. 154(b) by 1275 days.

(21) Appl. No.: 11/220,711

(22) Filed: Sep. 8, 2005

(65) Prior Publication Data

US 2007/0054078 A1     Mar. 8, 2007

(51) Int. Cl.
*B29C 49/50*     (2006.01)
(52) U.S. Cl. ........ 264/152; 264/138; 264/161; 264/523; 264/531; 264/534
(58) Field of Classification Search .................. None
See application file for complete search history.

(56) References Cited

U.S. PATENT DOCUMENTS

| | | | | |
|---|---|---|---|---|
| 3,198,375 | A | * | 8/1965 | Hunter ............................ 222/566 |
| 3,632,717 | A | * | 1/1972 | Showalter et al. ............. 264/152 |
| 4,816,093 | A | * | 3/1989 | Robbins, III ..................... 156/69 |
| 5,026,268 | A | | 6/1991 | Lee |
| 5,762,859 | A | * | 6/1998 | Kani .............................. 264/523 |
| 6,814,923 | B2 | * | 11/2004 | Bromley et al. ............... 264/536 |

FOREIGN PATENT DOCUMENTS

| | | |
|---|---|---|
| EP | 0 393 370 A2 | 10/1990 |
| GB | 1 117 412 A | 6/1968 |

OTHER PUBLICATIONS

PCT/US2006/034984—International Search Report dated May 9, 2007.

* cited by examiner

*Primary Examiner* — Monica A Huson
(74) *Attorney, Agent, or Firm* — Miles & Stockbridge P.C.; James T. Carmichael, Esq.; Michael A. Minter, Esq.

(57) ABSTRACT

A method of producing a container and a closure comprises blow molding a body comprising a container portion and a closure portion joined together, and separating the closure portion from the container portion. A container and/or a closure produced according to the method are also disclosed, as well as an intermediate product for producing a container and a closure.

19 Claims, 3 Drawing Sheets

SIMULTANEOUSLY BLOW MOLDED CONTAINER AND CLOSURE

BACKGROUND OF THE INVENTION

1. Field of the Invention

The present invention relates generally to blow molded containers and closures. More specifically, the present invention relates to containers and closures that are simultaneously blow molded.

2. Related Art

Methods for simultaneously molding a container and a closure, such as a lid, are known. Known methods include blow molding the container while simultaneously injection molding or compression molding the closure in the same mold. Typically, the cavity for the closure is located above the cavity for the container, along the parting line of the mold halves. This arrangement usually requires the cavity for the closure to be oriented vertically with respect to the container (e.g., tilted 90° with respect to its position when applied to the container), disadvantageously increasing the vertical dimension of the mold. In addition, closures made by this type of injection or compression molding process can be very costly. Furthermore, closures made by injection or compression molding processes often are not readily recyclable.

Therefore, there remains a need in the art for a closure that is simultaneously molded with the container in an efficient and cost-effective manner.

BRIEF SUMMARY OF THE INVENTION

The present invention relates to a method of producing a container and a closure. According to one exemplary embodiment, the method comprises blow molding a body comprising a container portion and a closure portion joined together, and separating the closure portion from the container portion. The body can further comprise a moil portion disposed between the container portion and the closure portion.

According to one aspect of the invention, the body defines a central axis, at least one of the container portion or the closure portion defines a non-round cross-section in a plane perpendicular to the central axis, and the moil portion defines a substantially round cross-section in a plane perpendicular to the central axis. Additionally or alternatively, at least one of the container portion or the closure portion can have a substantially square cross-section in a plane perpendicular to the central axis.

According to another aspect of the invention, the step of separating the closure portion from the container portion comprises cutting the body with a trimmer. Additionally or alternatively, the step of separating the closure portion from the container portion can comprise rotating the body with respect to the trimmer. A portion of the body can be adapted to engage a driving mechanism that imparts rotation to the body with respect to the trimmer. For example, the body can include a moil portion that is adapted to engage the driving mechanism.

According to still another aspect of the invention, the container portion defines a container central axis and the closure portion defines a closure central axis, and the body comprises the container portion and the closure portion with the container central axis oriented substantially parallel to the closure central axis.

According to yet another aspect of the invention, the container portion includes at least one indentation and the closure portion includes at least one corresponding protrusion adapted to engage the at least one indentation.

The present invention also relates to a container and/or a closure made by the above-described method.

The present invention further relates to an intermediate product for producing a container and a closure. The intermediate product comprises a plastic body comprising a container portion and a closure portion joined together, wherein the container portion defines a container central axis, the closure portion defines a closure central axis, and the closure central axis is substantially parallel to the container central axis.

According to one aspect of the invention, the plastic body can further comprise a moil portion disposed between the container portion and the closure portion. The plastic body can define a central axis, and the moil portion can have a substantially round cross-section in a plane perpendicular to the central axis. Additionally or alternatively, at least one of the container portion or the closure portion can have a substantially square cross-section in a plane perpendicular to the central axis.

According to another aspect of the invention, the container portion includes at least one indentation and the closure portion includes at least one corresponding protrusion adapted to engage the at least one indentation.

Further objectives and advantages, as well as the structure and function of preferred embodiments will become apparent from a consideration of the description, drawings, and examples.

BRIEF DESCRIPTION OF THE DRAWINGS

The foregoing and other features and advantages of the invention will be apparent from the following, more particular description of a preferred embodiment of the invention, as illustrated in the accompanying drawings wherein like reference numbers generally indicate identical, functionally similar, and/or structurally similar elements.

DETAILED DESCRIPTION OF THE INVENTION

Figure 2:
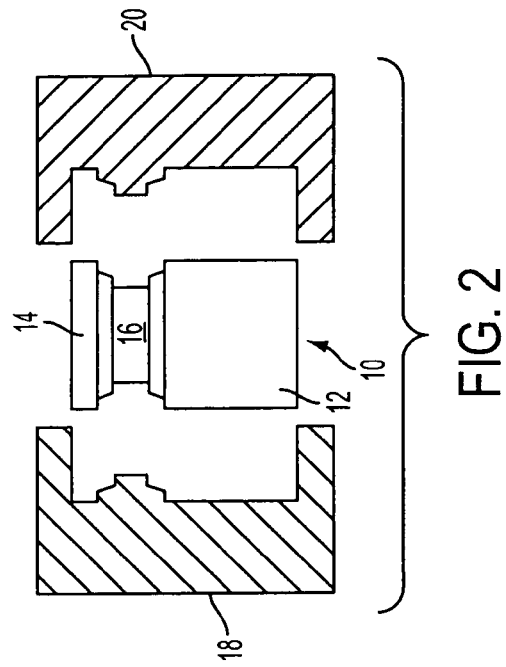
FIGS. 1-4 illustrate an exemplary method of producing a container and a closure according to the present invention.

Embodiments of the invention are discussed in detail below. In describing embodiments, specific terminology is employed for the sake of clarity. However, the invention is not intended to be limited to the specific terminology so selected. While specific exemplary embodiments are discussed, it should be understood that this is done for illustration purposes only. A person skilled in the relevant art will recognize that other components and configurations can be used without parting from the spirit and scope of the invention. All references cited herein are incorporated by reference as if each had been individually incorporated.

Referring to FIGS. 1-4, an exemplary method of producing a container and a closure according to the present invention is shown. The method includes blow molding a body 10 which comprises a container portion 12 and a closure portion 14 joined together. The body can also include one or more moil portions, such as the moil portion 16 located between the container portion 12 and the closure portion 14. The body 10 can be blow molded in a cavity defined by a pair of mold halves 18, 20 using one of several known blow molding techniques, such as, for example, extrusion blow molding, injection blow molding, or stretch blow molding. According to one exemplary embodiment, the body 10 can be extrusion blow molded by inserting the blow needle (not shown) into the moil portion 16.

Body 10 can be blow molded from a monolayer plastic material, such as a polyamide, for example, nylon; a polyolefin such as polyethylene, for example, low density polyethylene (LDPE) or high density polyethylene (HDPE), or polypropylene; a polyester, for example polyethylene terephthalate (PET), polyethylene naphtalate (PEN); or others, which can also include additives to vary the physical or chemical properties of the material. For example, some plastic resins can be modified to improve the oxygen permeability. Alternatively, the container can be prepared from a multilayer plastic material. The layers can be any plastic material, including virgin, recycled and reground material, and can include plastics or other materials with additives to improve physical properties of the container. In addition to the above-mentioned materials, other materials often used in multilayer plastic containers include, for example, ethylvinyl alcohol (EVOH) and tie layers or binders to hold together materials that are subject to delamination when used in adjacent layers. A coating may be applied over the monolayer or multilayer material, for example to introduce oxygen barrier properties.

Figure 3:
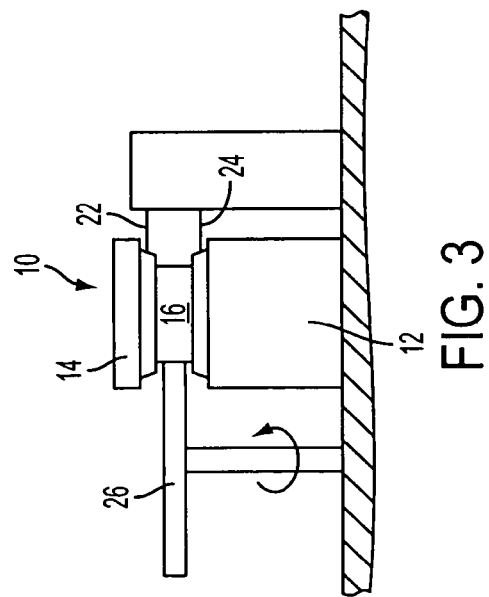

Once the body 10 is blow molded, the mold halves 18, 20 separate to release the body 10 from the mold, as shown in FIG. 2. Next, the container portion 12 and the closure portion 14 are separated, as shown in FIG. 3. For example, the body 10 can be cut with a trimmer, such as a blade, hot knife, hot wire, or other device, to separate the container portion 12 and the closure portion 14. The exemplary embodiment of FIG. 3 includes an upper trimmer 22 that separates the closure portion 14 from the moil portion 16, and a lower trimmer 24 that separates the moil portion 16 from the container portion 12. The upper trimmer 22 and lower trimmer 24 can act on the body 10 simultaneously, as shown in FIG. 3, or alternatively, can act on the body 10 in separate steps. Blow molding the container portion 12 and closure portion 14 in the same process can result in a container and closure that are made from the same material, thereby eliminating the need to separate the container from the closure during recycling. In addition, closures made by the blow molding process are more likely to be recyclable than a conventional, injection or compression molded closures.

To facilitate cutting the body 10 with the trimmers 22, 24, the body 10 can be placed in contact with the trimmers 22, 24 and rotated with respect thereto. For example, a driving mechanism 26 such as a motorized wheel or belt can engage the body 10 to impart rotation thereto. In the exemplary embodiment of FIG. 3, the driving mechanism 26 engages the moil portion 16 which has a substantially round cross-section to facilitate smooth on-axis rotation of the body 10. According to an alternative embodiment, the driving mechanism 26 can engage the container portion 12, and/or the closure portion 14, and/or some other part of the body 10.

Figure 4:
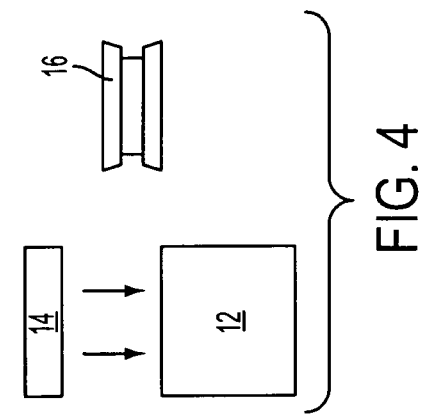
Figure 1:
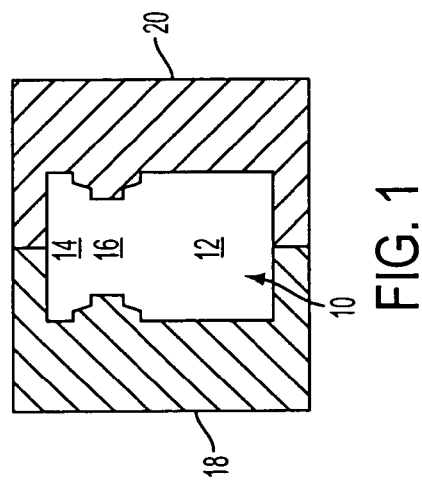

Referring to FIG. 4, once the container portion 12, closure portion 14, and optional moil portion 16 have been separated, the closure portion 14 can be placed onto the container portion 12, for example by snaps, as will be discussed in more detail below, or alternatively by threads or other structures known in the art. The moil portion 16, if provided, can be discarded or recycled.

Figure 5:
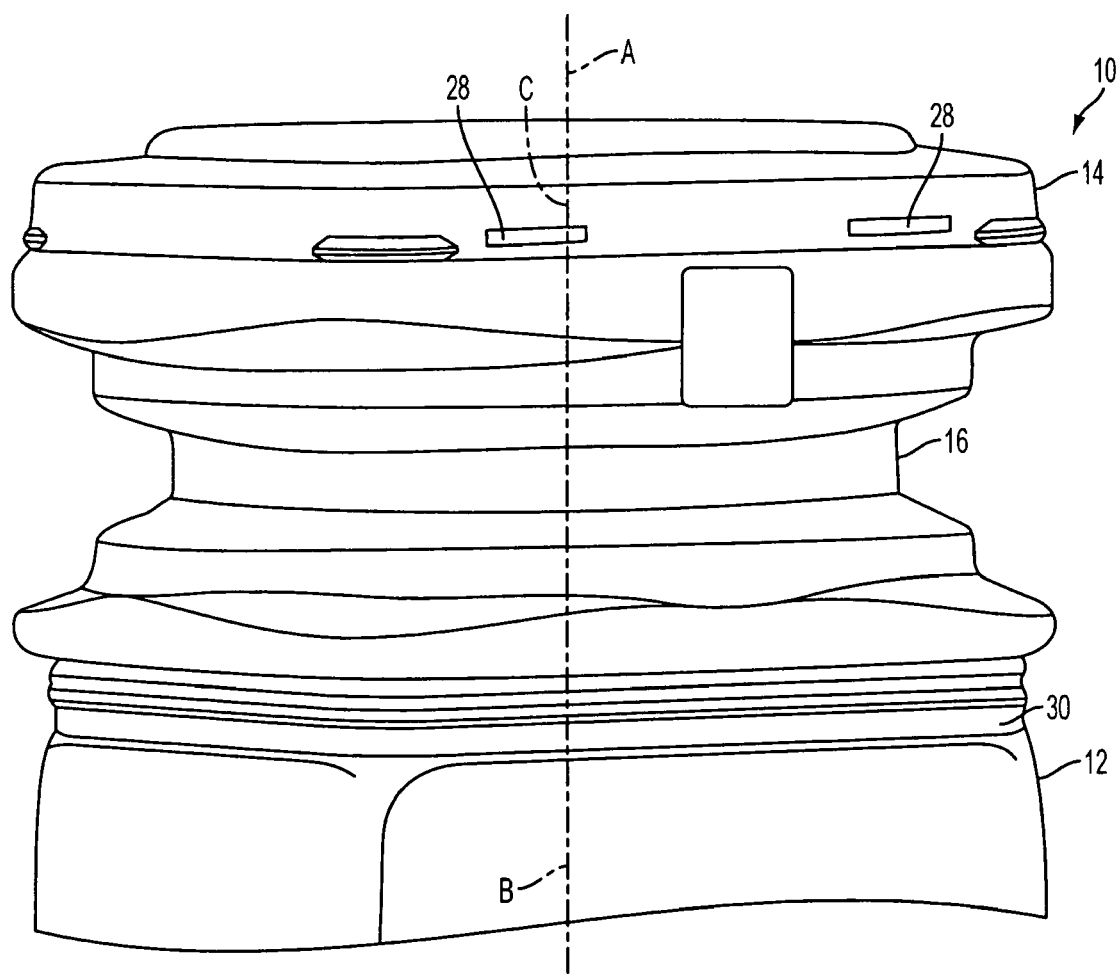
FIG. 5 is a partial perspective view of an exemplary embodiment of an intermediate product for producing a container and a closure according to the present invention.

Referring to FIG. 5, a portion of an exemplary embodiment of body 10 is shown in detail. Body 10 can define a central axis A. Moil portion 16 can define a cross-section in a plane perpendicular to the central axis A that is substantially round.

As discussed above, this substantially round cross-section can facilitate on-axis rotation of body 10 when it engages a driving mechanism, such as the driving mechanism 26 of FIG. 3. Container portion 12 and/or closure portion 14 can have a non-round cross-section in the plane perpendicular to the central axis A, such as the square cross-sections shown. Alternative cross-sectional shapes can include, for example, other substantially polygonal transverse cross-sectional shapes such as triangular, pentagonal, etc.; a circular or oval transverse cross-section; or combinations of curved and arced shapes with linear shapes. As will be understood by one of ordinary skill in the art, when the container has a substantially polygonal transverse cross-sectional shape, the corners of the polygon are typically rounded or chamfered.

Still referring to FIG. 5, the container portion 12 defines its own central axis B and the closure portion 14 defines it own central axis C. In the exemplary embodiment shown, these axes are collinear with the body central axis A. When the container portion 12 and the closure portion 14 are still joined together, the container central axis B is preferably parallel with the closure central axis C (i.e., with the closure portion 12 oriented in the position in which it is applied to the container portion 12). This configuration can reduce the overall height of body 10 as compared to prior art configurations, thereby potentially saving valuable space in the molding machine.

Figure 6:
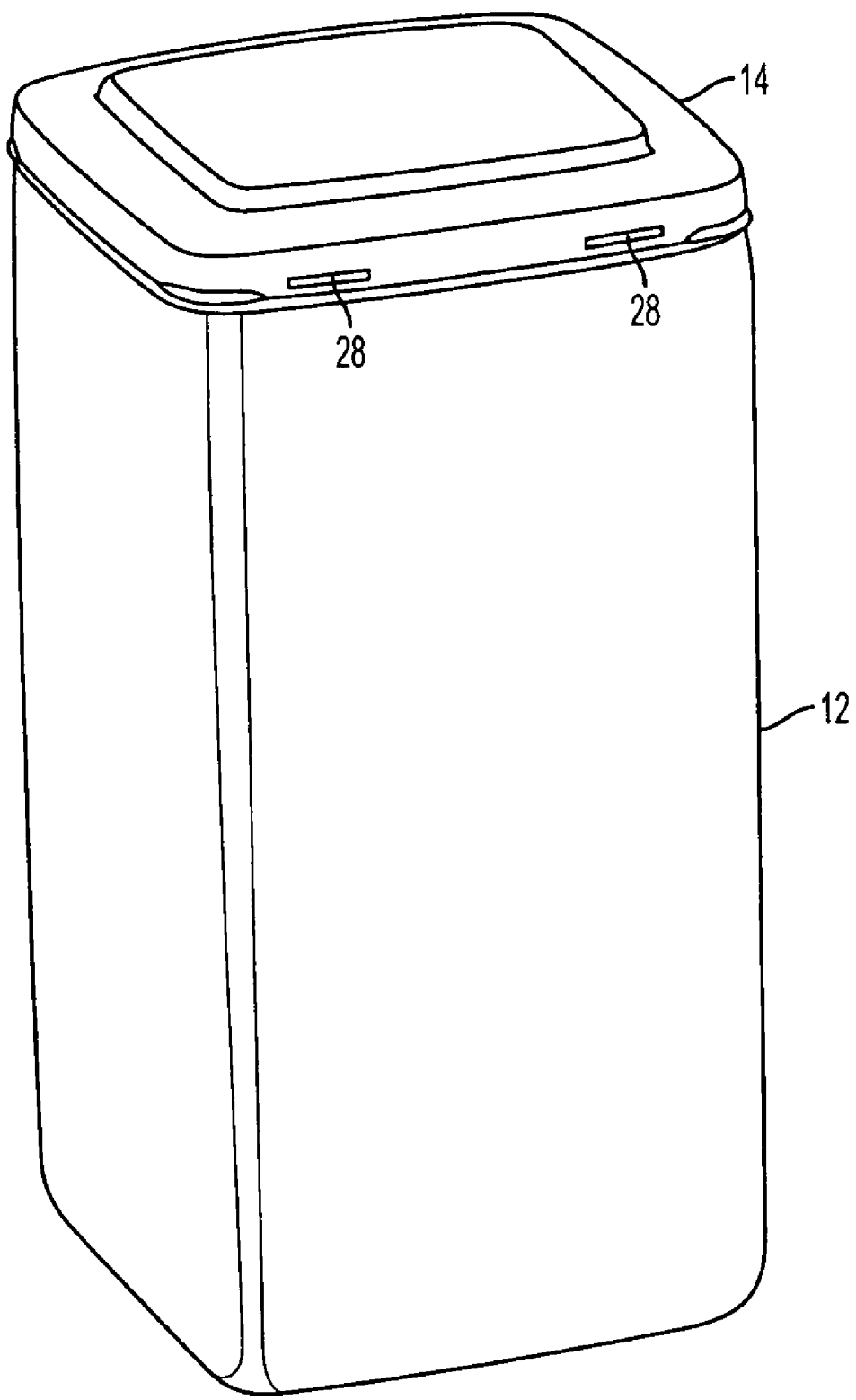
FIG. 6 is a perspective view of an exemplary embodiment of a container and a closure according to the present invention, shown with the closure attached to the container.

The closure portion 14 and container portion 12 can include one or more snaps to hold the closure portion 14 on the container portion 12. For example, closure portion 14 can include at least one inward protrusion 28 (shown from behind in FIG. 5) and container portion 12 can include at least one indentation 30 (shown as a recess extending around the upper perimeter of container portion 12 in FIG. 5) that engage one another to hold the closure portion 14 on the container portion 12, as shown in FIG. 6. The protrusion(s) can alternatively be located on the container portion 12 with the indentation(s) provided on the closure portion 14. One of ordinary skill in the art will understand that many other structures, such as threads, cams, etc., may alternatively be used to hold closure portion 14 on the container portion 12.

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

What is claimed is:

1. A method of producing a container and a closure, comprising: blow molding a body comprising a container portion and a closure portion joined together; and separating the closure portion from the container portion;

wherein the body is blow molded as a single-walled body;

wherein the separating the closure portion from the container portion is performed directly following the blow molding the body, to produce a finished container and closure product;

wherein the body defines a central axis and further comprises a central moil portion extending from the container portion to the closure portion;

wherein the body is blow molded by inserting an air needle into the central moil portion; and wherein an inter-blade moil driver contacts the moil below an upper moil trimmer location and above a lower moil trimmer location.

2. The method of claim 1, wherein at least one of the container portion or the closure portion defines a non-round cross-section in a plane perpendicular to the central axis, and the moil portion defines a substantially round cross-section in a plane perpendicular to the central axis.

3. The method of claim 2, wherein at least one of the container portion or the closure portion has a substantially square cross-section in a plane perpendicular to the central axis.

4. The method of claim 1, wherein the step of separating the closure portion from the container portion comprises cutting the body with a trimmer.

5. The method of claim 4, wherein the step of separating the closure portion from the container portion comprises rotating the body with respect to the trimmer.

6. The method of claim 5, wherein the central moil is adapted to engage the moil driver such that the moil driver imparts rotation to the body with respect to the trimmer.

7. The method of claim 6, wherein the central moil is adapted to engage the moil driver below the closure portion and above the container portion.

8. The method of claim 7, wherein the moil portion has a substantially round cross-section in a plane perpendicular to the central axis.

9. The method of claim 1, wherein the container portion defines a container central axis and the closure portion defines a closure central axis, and the body comprises the container portion and the closure portion with the container central axis oriented substantially parallel to the closure central axis and with the closure portion oriented in a position for being applied to the container portion following separation of the closure portion from the container portion.

10. The method of claim 1, wherein the container portion includes at least one indentation and the closure portion includes at least one corresponding protrusion adapted to engage the at least one indentation.

11. The method of claim 1, wherein the body is plastic.

12. The method of claim 7, wherein the trimmer comprises an upper trimmer portion that separates the closure portion from the central moil and a lower trimmer portion that separates the central moil from the container portion, and the moil driver engages the moil below the upper trimmer portion and above the lower trimmer portion.

13. The method of claim 1, wherein the closure portion includes at least one indentation and the container portion includes at least one corresponding protrusion adapted to engage the at least one indentation.

14. The method of claim 1, wherein the body is formed in one piece.

15. The method of claim 1, wherein the separating the closure portion from the container portion comprises placing the body in contact with a trimmer, engaging the moil portion of the body with a belt or motorized wheel to impart rotation to the body, and cutting a portion of the body with the trimmer, the portion of the body having a free form shape.

16. The method of claim 15, wherein the body defines a central axis, the portion of the body to be cut with the trimmer defines a non-round cross-section in a plane perpendicular to the central axis, and the portion of the body to be engaged with the belt or motorized wheel defines a substantially round cross-section in a plane perpendicular to the central axis.

17. The method of claim 1, wherein the central moil defines a substantially round cross-section in a plane perpendicular to the central axis, the closure defines a substantially non-round cross-section in a plane perpendicular to the central axis, and an upper end of the central moil includes a cylindrical portion of varying height proximal a transition from the central moil to the closure.

18. The method of claim 1, wherein the central moil defines a substantially round cross-section in a plane perpendicular to the central axis, the container defines a substantially non-round cross-section in a plane perpendicular to the central axis, and a lower end of the central moil includes a cylindrical portion of varying height proximal a transition from the central moil to the container.

19. The method of claim 1, an outer periphery of the moil portion having a rectangular panel portion oriented in a plane parallel to the central axis.

* * * * *